United States Patent [19]

Creed

[11] Patent Number: 5,140,864
[45] Date of Patent: Aug. 25, 1992

[54] FRICTION INDEPENDENT CONTINUOUSLY VARIABLE TRANSMISSION

[76] Inventor: Durwood L. Creed, 3 Terrace Dr., Rome, N.Y. 13440

[21] Appl. No.: 534,163

[22] Filed: Jun. 6, 1990

[51] Int. Cl.$^5$ .................. F16H 23/04; F16H 23/10
[52] U.S. Cl. .................................... 74/60; 475/163
[58] Field of Search ............ 74/60, 126, 199; 475/163

[56] References Cited

U.S. PATENT DOCUMENTS

| | | | |
|---|---|---|---|
| 2,112,934 | 4/1938 | Stinnes et al. | 74/60 |
| 2,387,908 | 10/1945 | Howard | 74/60 |
| 3,977,275 | 8/1976 | Kiesewetter et al. | 475/163 |
| 4,155,407 | 5/1979 | Christiansen | 74/60 X |
| 4,235,116 | 11/1980 | Meijer et al. | 74/60 |
| 4,365,940 | 12/1982 | Hosokawa | 74/60 X |
| 4,841,809 | 6/1989 | Jolly | 475/163 |

FOREIGN PATENT DOCUMENTS

| | | | |
|---|---|---|---|
| 59-6451 | 1/1984 | Japan | 475/163 |
| 62-46045 | 2/1987 | Japan | 475/163 |
| 977878 | 11/1982 | U.S.S.R. | 475/163 |

*Primary Examiner*—Allan D. Herrmann
*Assistant Examiner*—Julie Krolikowski

[57] ABSTRACT

The face angle dependent force versus displacement properties of the double faced, asymmetrical inclined plane are extended to a three dimensional rotating machine which exhibits the properties of continuously variable torque versus speed ratios in both forward and reverse directions. These desired properties are obtained in the three dimensional model through the use of circular disks which are tilted on their axes of rotation to create the force versus angle properties of the inclined plane. The selection of desired torque-speed ratios including transitioning through a zero speed or "frictionless clutch" operation. Ratio selection is accomplished by setting the tilt angles of three disks around their respective axes of rotation. Two of these disks are mounted through universal joint mounts to the transmission output shaft and the third disk is mounted, through a universal joint mount, to a non-rotating sleeve surrounding the output shaft. Orthogonal torque components are coupled between adjacent disks by sets of rollers mounted at 90° increments around each disk and rotating in synchronism with the disk's motion.

Since all force and motion coupling surfaces are, in the preferred embodiment, positive displacement rolling contact types, power transfer efficiency is very high. Also, since tapered roller to disk coupling surfaces can be non-slip for all contact surface ratios, the transmission of the invention is inherently robust and scalable to all size and power regimes.

14 Claims, 9 Drawing Sheets

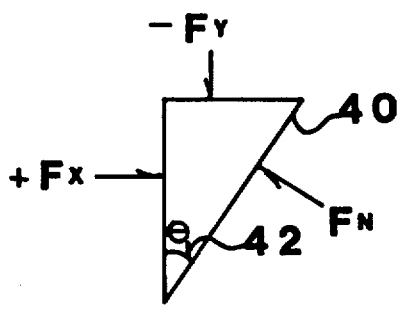
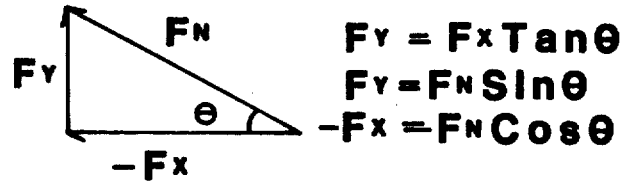
FIG. 1     FIG. 2
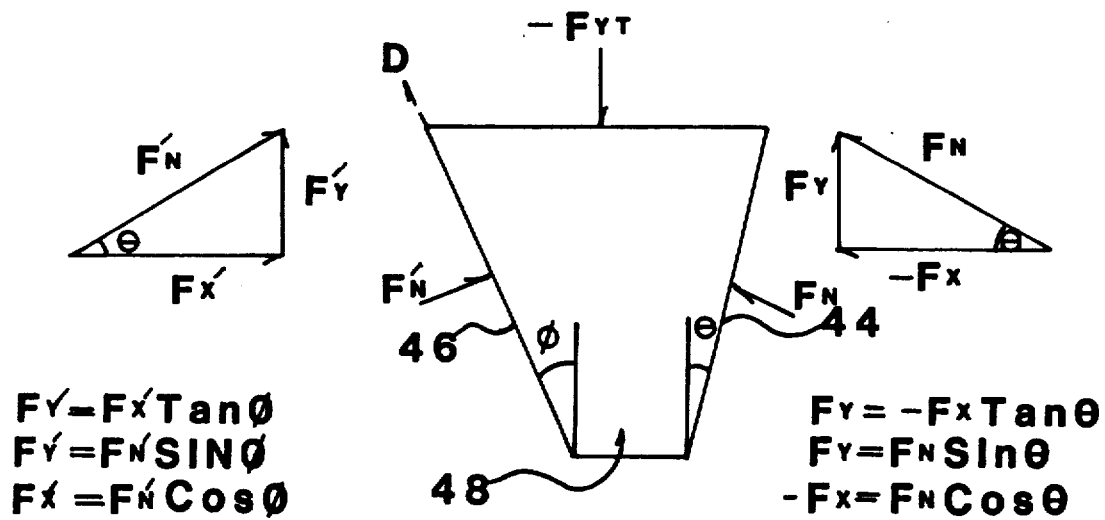
FIG. 3
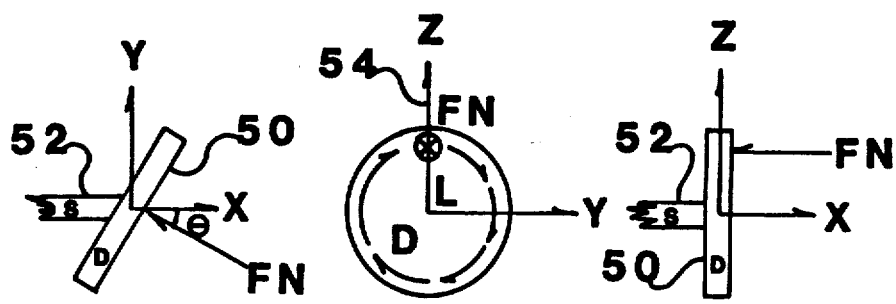
FIG. 4A     FIG. 4B     FIG. 4C

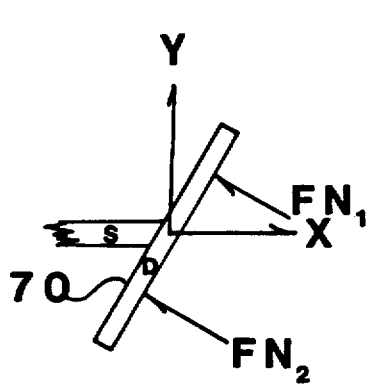
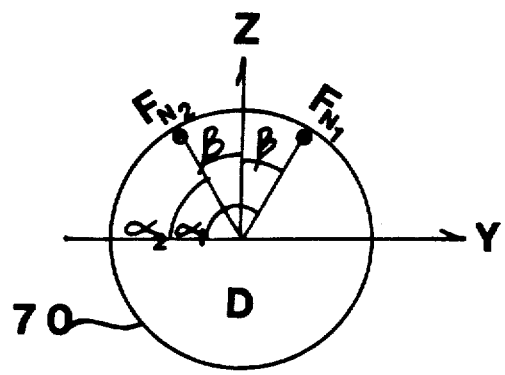
FIG.7A  FIG.7B
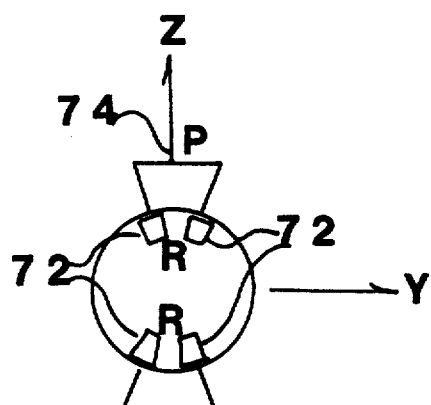
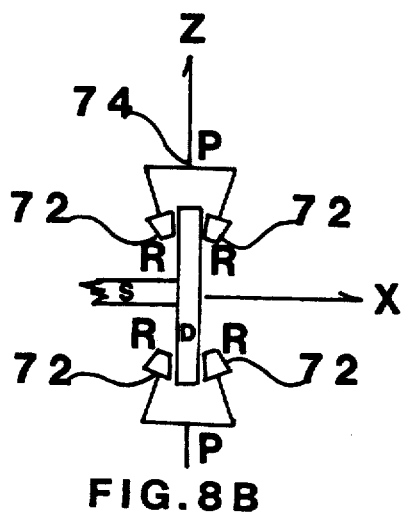
FIG.8A  FIG.8B
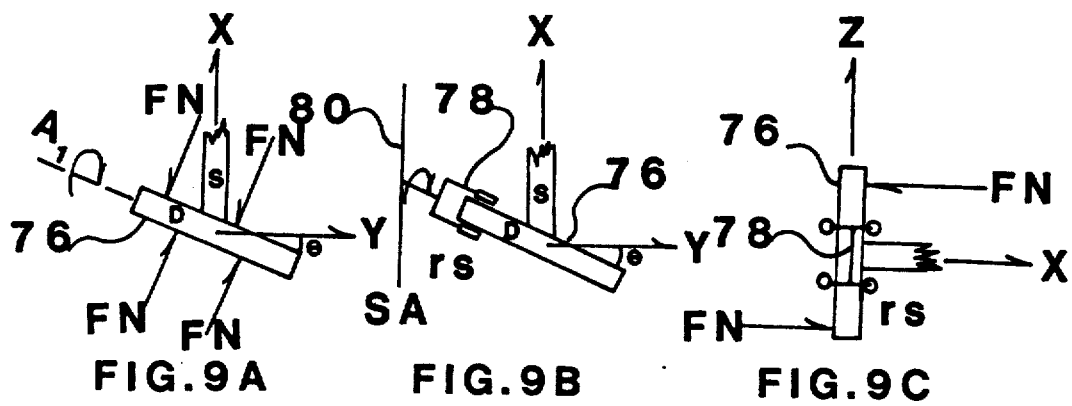
FIG.9A  FIG.9B  FIG.9C $$F_{y(OUT)} = F_{y(IN)} \left[1 + (\tan\phi/\tan\theta)\right]$$
$$F_x = [F_{y(IN)}/\tan\theta]$$

| θ | φ | Fy(OUT) | Fx |
|---|---|---|---|
| 1° | 1° | 2Fy(IN) | 57Fy(IN) |
| 1° | 3° | 4Fy(IN) | 57Fy(IN) |
| 1° | 5° | 6Fy(IN) | 57Fy(IN) |
| 1° | 10° | 11Fy(IN) | 57Fy(IN) |
| 5° | 10° | 3Fy(IN) | 11.4Fy(IN) |
| 5° | 15° | 4Fy(IN) | 11.4Fy(IN) |
| 5° | 20° | 5.2Fy(IN) | 11.4Fy(IN) |
| 5° | 30° | 7.6Fy(IN) | 11.4Fy(IN) |
| 10° | 15° | 2.5Fy(IN) | 5.7Fy(IN) |
| 10° | 20° | 3Fy(IN) | 5.7Fy(IN) |
| 10° | 30° | 4.3Fy(IN) | 5.7Fy(IN) |

FIG. 12

WEDGE FACE ANGLES VS. FORCE TRANSFORMATION RATIOS

DISK TILT ANGLES VS. INPUT-OUTPUT TORQUE RATIOS $$T_{OUT} = T_{IN} \left[ 1 + (TAN\phi / TAN\theta) \right]$$

$$T_{RANGE} \left[ (T_{OUT}/T_{IN})_{MAX} \right] / \left[ (T_{OUT}/T_{IN})_{MIN} \right]$$

| θ | +φ | Tx(OUT) | -φ | Tx(OUT) | Trange |
|---|----|---------|----|---------|--------|
| 5° | 5° | 2.0Tx(IN) | -3° | 0.4Tx(IN) | 4.99 |
| 5° | 5° | 2.0Tx(IN) | -4° | 0.2Tx(IN) | 9.96 |
| 10° | 20° | 3.1Tx(IN) | -2° | 0.8Tx(IN) | 3.83 |
| 10° | 20° | 3.1Tx(IN) | -4° | 0.6Tx(IN) | 5.10 |
| 10° | 20° | 3.1Tx(IN) | -6° | 0.4Tx(IN) | 7.65 |
| 10° | 20° | 3.1Tx(IN) | -8° | 0.2Tx(IN) | 15.30 |
| 10° | | | -20° | -1.06Tx(IN) | |
| 10° | | | -25° | -1.64Tx(IN) | |
| 10° | | | -30° | -2.27Tx(IN) | |

FIG. 13

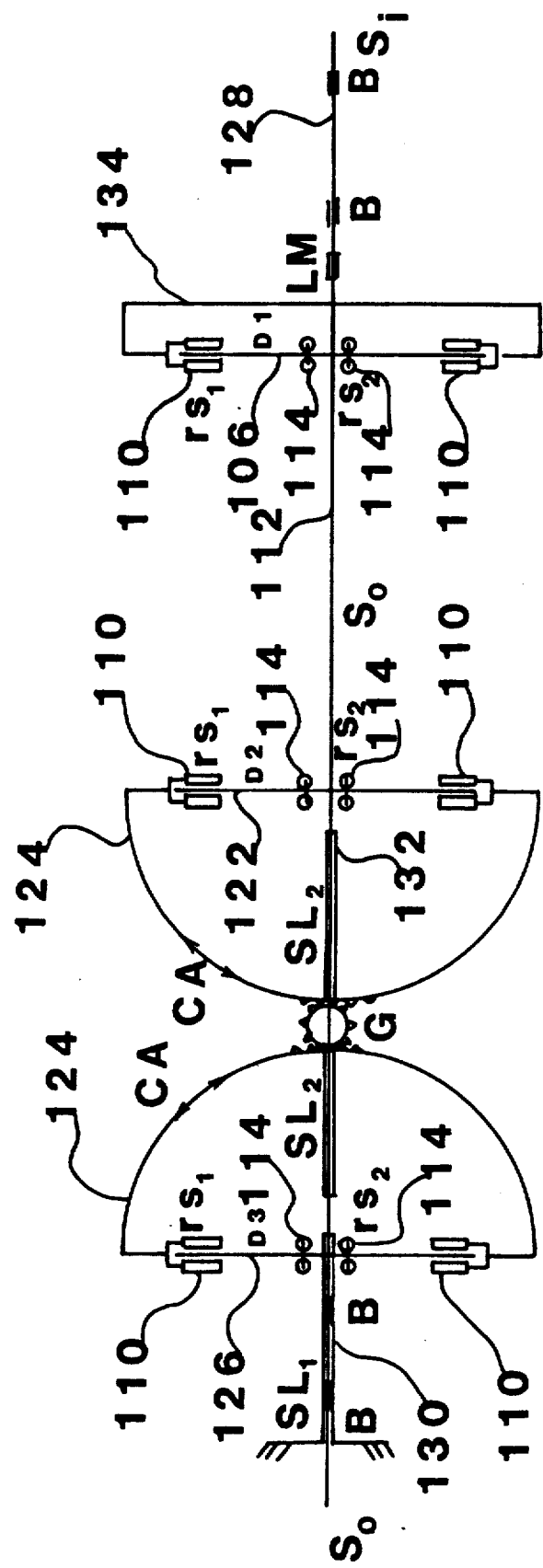
FIG 17.B

FRICTION INDEPENDENT CONTINUOUSLY VARIABLE TRANSMISSION

BACKGROUND OF THE INVENTION

1. Field of the Invention

This invention relates in general to transmissions for self propelled vehicle or rotating machinery use and in particular to high efficiency all mechanical continuously variable ratio transmissions.

2. Prior Art

The need for a high efficiency, continuously variable ratio (CVR) transmission, or mechanical impedance transformer, has been well recognized in the motor vehicle industry and to a lesser extent throughout the industrial machine community. The potential usefulness of such a device in the automobile has increased greatly with the introduction of the on-board microprocessor, since the type of sophisticated control required to fully exploit such a transmission is now easily available.

The limitations of presently employed types of transmissions are well known and therefore are only briefly described below. Mechanical gear train types are the lowest loss but offer only discrete torque vs. speed ratios and are thus only approximating an optimum match from engine to load. Hydraulic torque converter transmissions are relatively high loss as demonstrated by the oil coolers associated with them. Other types of lower power handling mechanical transmissions, which may incorporate a continuously variable ratio feature, all depend on a friction surface coupling which immediately introduces losses, wear rate problems and maximum power transfer limitations.

All presently employed types of transmissions are based on the use of either the lever arm or the inclined plane basic machines of physics. For the lever arm types, changing speed-torque ratios means changing input to output lever arm ratios. With one known exception, these lever arm changes employ friction surface couplings with all of the basic limitations described above. The exception is U.S. Pat. No. 4,660,427 which employs a sequence of meshed gear couplings. However, this concept is intrinsically complex, fragile and capable of one way power flow only.

For the inclined plane types, changing speed-torque ratios means changing the tilt angle of a rotating element, such as the well known swash plate used in many positive displacement hydraulic type transmissions. All of these hydraulic transmissions suffer from fluid flow friction losses and are therefore not suitable for high efficiency, controllable ratio applications. U.S. Pat. No. 4,763,544 also uses the swash plate together with oscillating pawls to achieve an all mechanical type transmission. However, this implementation is also complex, fragile and limited to one way power flow.

OBJECTS AND ADVANTAGES

Accordingly several objects and advantages of the present invention are:

(a) To provide an all mechanical continuously variable ratio transmission with all positive displacement, friction independent coupling surfaces.

(b) To provide a transmission in which all coupling surfaces may be either of the well lubricated sliding type or the all rolling type so as to minimize all sources of friction.

(c) To provide a transmission in which the input-output speed-torque ratios can be continuously varied in both forward and reverse output directions over a large dynamic range, and bi-directional power flow is intrinsic.

(d) To provide a transmission in which a lossless disconnect or "frictionless clutch" function is intrinsic to the mechanism.

(e) To provide a transmission which is inherently robust and scalable to all size, speed and power regimes.

Still further objects and advantages will become apparent from a consideration of the ensuing description and drawings.

DRAWING FIGURES

In the drawings, closely related figures have the same number but different alphabetic suffixes.

FIG. 1 is a two dimensional representation of an inclined plane with face tilt angle $\theta$, a force $F_n$ normal to the plane face 40 and two orthogonal reaction forces, $F_x$ and $-F_y$.

FIG. 2 shows the trigonemetric relationships of the three forces present on the inclined plane of FIG. 1.

FIG. 3 is a two dimensional represenation of a double faced inclined plane with face tilt angles $\theta$, $\Phi$, together with trigonemetric diagrams of all force components acting on the plane's faces.

FIGS. 4a, 4b, 4c are three orthogonal views of a circular disk D, mounted via a universal joint (not shown) to shaft S, tilted at an angle $\theta$, and having a rotating force $F_n$ impressed upon its surface.

FIGS. 7a, 7b show two orthogonal views of disk, D, mounted via a universal joint (not shown) to shaft S and having two forces, $F_{n1}$ and $F_{n2}$, impressed on the disk's face at mathematically defined, symmetrically spaced positions.

FIGS. 8a, 8b are two orthogonal views of disk D mounted via a universal joint (not shown) to shaft S and having sets of rollers r mounted from pivot P so as to be in contact with disk D.

FIG. 9a shows disk D mounted via a universal joint (not shown) to shaft S tilted at an angle $\theta$ and having a torque around axis $A_1$ resulting from force couples $F_n$.

FIGS. 9b, 9c are two orthogonal views of the disk and shaft of FIG. 9a with the addition of roller set rs mounted to support arm SA and in contact with both faces of disk D.

FIG. 12 is a tabulation of calculated values of collinear force transformation ratios for the double faced inclined plane of FIG. 3, as a function of face tilt angles.

FIG. 13 is a tabulation of calculated values of disk tilt angles vs. input-output torque transformation ratios for the complete transmission assembly of FIGS. 17a, b.

FIG. 17b is an orthogonal view of the components of FIG. 17a showing the mounting and coupling details of the type $rs_1$ roller sets.

REFERENCE NUMERALS IN DRAWINGS

Figure 5:
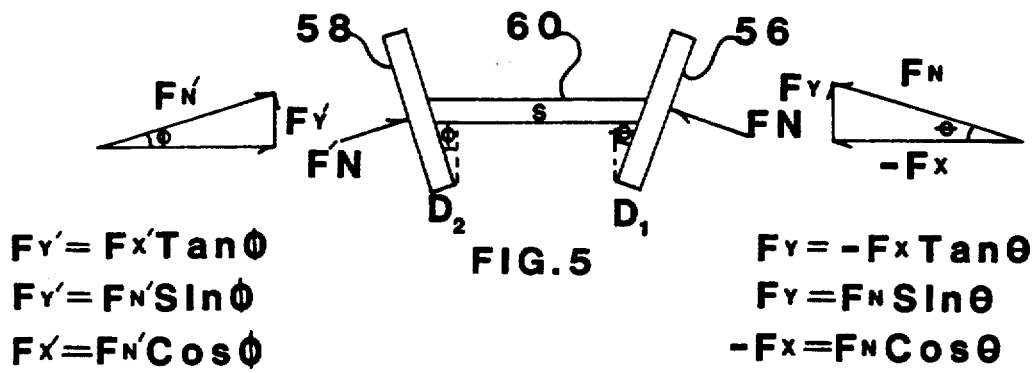
FIG. 5 is a two dimensional representation of two circular disks, $D_1$ and $D_2$, mounted via universal joints (not shown) to opposite ends of shaft S and tilted at angles $\theta$ and $\Phi$ respectively, together with trigonemetric diagrams of all force components of two applied forces, $F_n$ and $F_n'$.
Figure 5A:
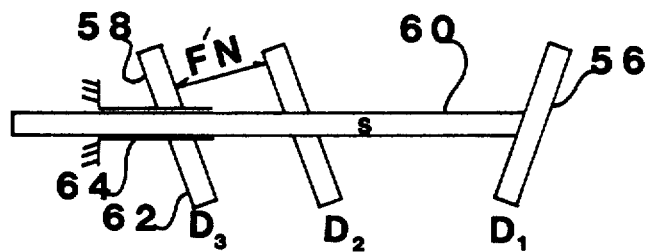
FIG. 5a is a two dimensional representation of the two disks and shaft of FIG. 5 with the addition of a third disk $D_3$ mounted via a universal joint (not shown) to sleeve $S_1$ and depicting a force transfer $F_n'$ between disks $D_2$, $D_3$.
Figures 6A, 6B, 6C:
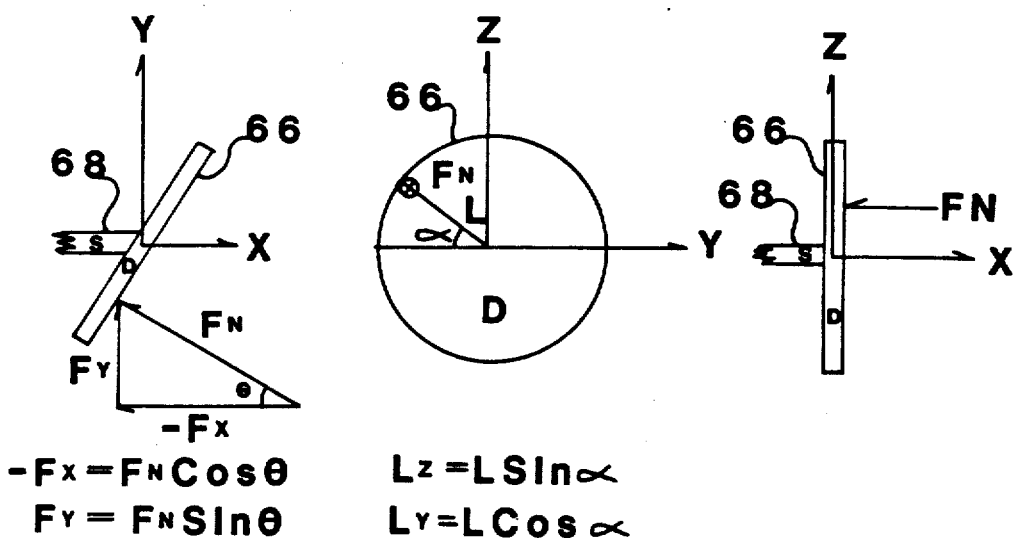
FIGS. 6a, 6b, 6c are three orthogonal views of a circular disk D mounted via a universal joint (not shown) to shaft S and having a force $F_n$ impressed at a mathematically defined, generalized position on the disk's face.
Figures 10A, 10B:
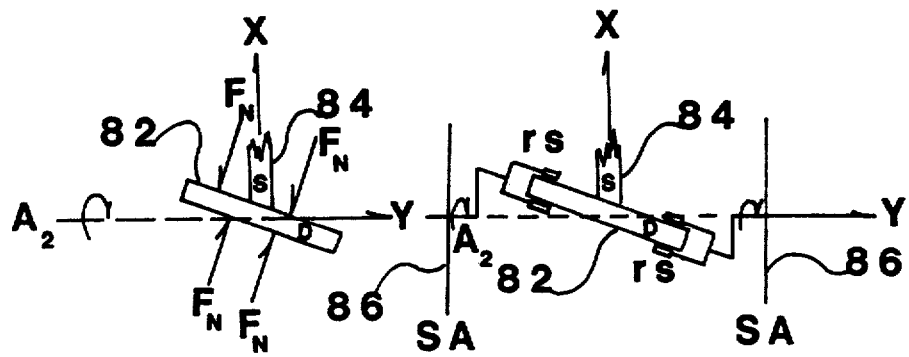
FIG. 10a shows disk D mounted via a universal joint (not shown) to shaft S and having a torque around axis $A_2$ resulting from force couples $F_n$.
FIG. 10b shows the disk and shaft of FIG. 10a with the addition of roller sets rs mounted to their support arms SA and in contact with disk D so as to transfer the torque around axis $A_2$ from disk D to support arms SA.
Figures 11A, 11B:
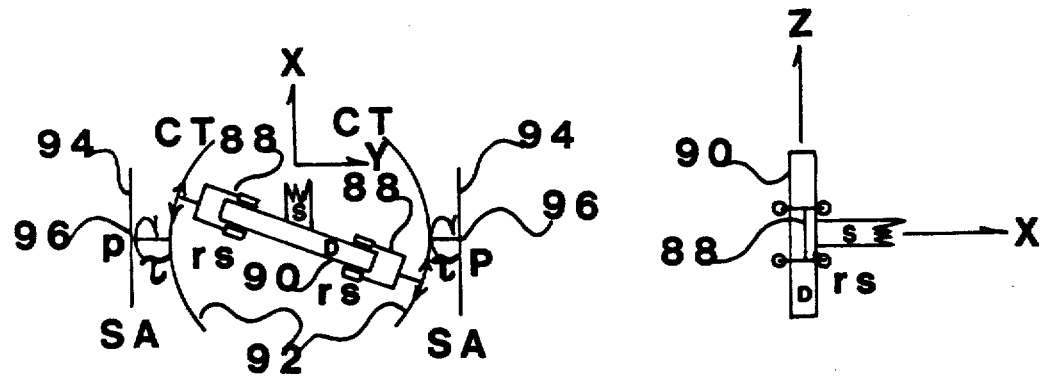
FIGS. 11a, 11b show two orthogonal views of the disk, shaft and roller sets of FIG. 10b with the addition of a circular track CT which allows roller sets rs to remain in contact with disk D and transfer torque $\gamma$ to support arms SA independent of the tilt angle of disk D relative to shaft S.
Figure 14:
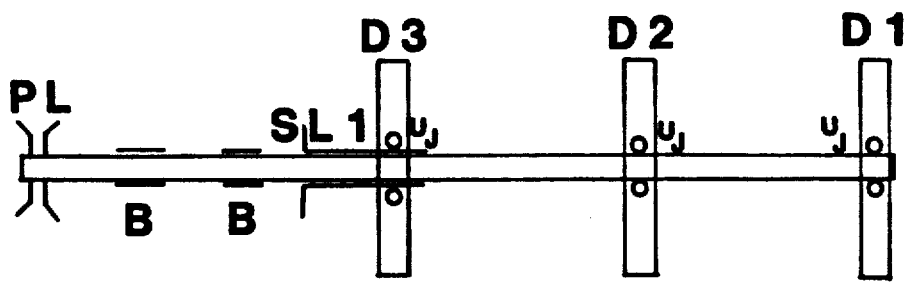
FIG. 14 is a cross section of the output shaft assembly showing disks $D_1$, $D_2$, mounted via. universal joints $U_3$ to output shaft $S_0$ and disk $D_3$ mounted to sleeve $SL_1$. Shaft support bearings B and pulley PL are also shown.
Figure 15A:
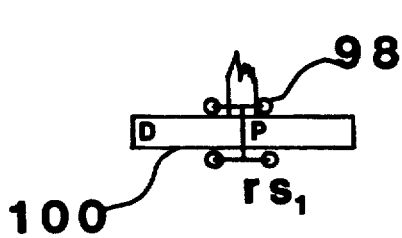
FIG. 15a is an edge view of disk D showing roller set $rs_1$ mounted from pivot P with all four rollers in contact with the disk face.
Figure 15B:
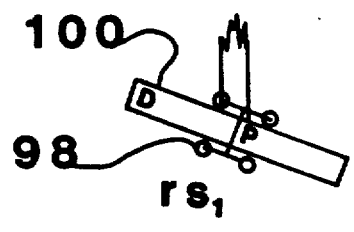
FIG. 15b shows the disk D and roller set $rs_1$ of FIG. 15a in a tilted position relative to shaft S.
Figure 16A:
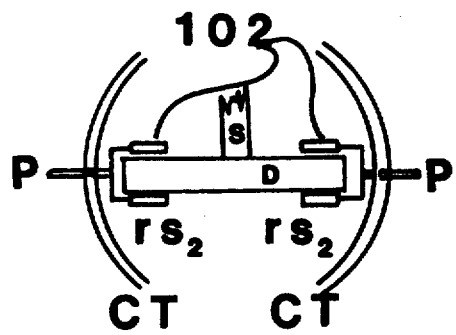
FIG. 16a is a cross section edge view of disk D mounted via. a universal joint (not shown) to shaft S and with roller sets $rs_2$ mounted to circular track CT while being in contact with the faces of disk D.
Figure 16B:
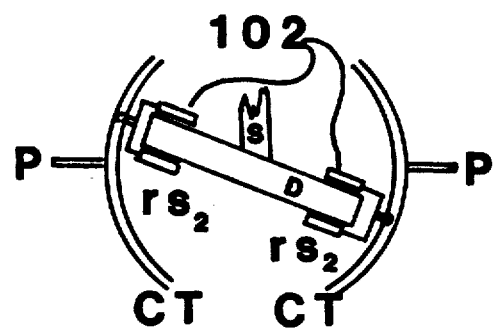
FIG. 16b shows the disk D and roller sets $rs_2$ of FIG. 16a in a tilted position relative to shaft S.
Figure 17A:
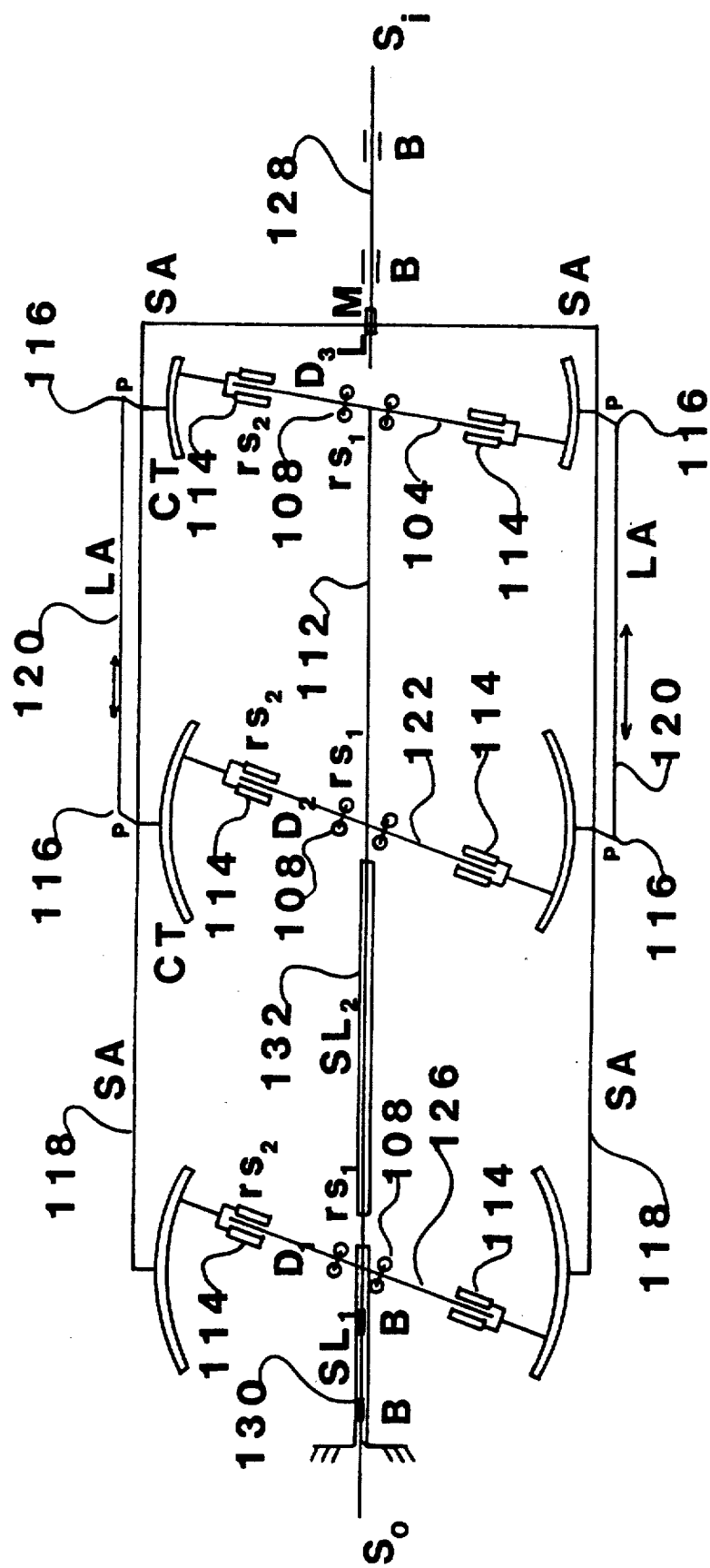
FIG. 17a is a cross sectional, schematic view of the complete transmission showing the three disks $D_1$, $D_2$, $D_3$, in tilted positions relative to the output shaft $S_0$; the three type $rs_2$ roller sets mounted through their circular tracks CT to support arms SA; and other major components as identified herein.

40 FIG. 1, face of inclined plane.
42 FIG. 1, tilt angle of face from the vertical.
44 FIG. 3, right face.
46 FIG. 3, left face.
48 Body of FIG. 3
50 Disk D of FIGS. 4a–4c.
52 Shaft S of FIGS. 4a–4c.
54 Z-axis of FIG. 4b.
56 Disk $D_1$ of FIGS. 5, 5a.
58 Disk $D_2$ of FIGS. 5, 5a.
60 Shaft S of FIGS. 5, 5a.
62 Disk $D_3$ of FIG. 5a.
64 FIG. 5a fixed sleeve.
66 Disk D of FIGS. 6a, 6b, 6c.
68 Shaft S of FIGS. 6a, 6b, 6c.
70 Disk D of FIGS. 7a, 7b.
72 Rollers R of FIGS. 8a, 8b.
74 Pivot P of FIGS. 8a, 8b.
76 Disk D of FIGS. 9a, 9b, 9c.
78 Roller coupling rs of FIGS. 9b, 9c.
80 Support arm SA of FIG. 9b.
82 Disk D of FIGS. 10a, 10b.
84 Shaft S of FIGS. 10a, 10b.
86 Support arm SA of FIG. 10b.
88 Roller sets rs of FIGS. 11a, 11b.
90 Disk D of FIGS. 11a, 11b.
92 Circular track CT of FIG. 11a.
94 Support arm SA of FIG. 11a.
96 Pivot P of FIG. 11a.
98 Roller sets $rs_1$ of FIGS. 15a, 15b.
100 Disk D of FIGS. 15a, 15b.
102 Roller sets $rs_2$ of FIGS. 16a,b.
104 Disk $D_1$ of FIG. 17a.
106 Disk $D_1$ of FIG. 17b.
108 Roller set $rs_1$ of FIG. 17a.
110 Roller set $rs_1$ of FIG. 17b.
112 Shaft $S_0$ of FIGS. 17a,b.
114 Roller set $rs_2$ of FIGS. 17a,b.
116 Pivot P of FIG. 17a.
118 Support arm SA of FIG. 17a.
120 Linkage arm LA of FIG. 17a.
122 Disk $D_2$ of FIGS. 17a,b.
124 Coupling arm CA of FIG. 17b.
126 Disk $D_3$ of FIGS. 17a,b.
128 Input shaft $S_1$ of FIGS. 17a,b.
130 Sleeve mount $SL_1$
132 Sleeve mount $SL_2$

DESCRIPTION OF INVENTION

Since the CVR transmission's operation depends upon basic properties of the inclined plane a review of these properties for a two dimensional model is appropriate. Following this, it will be shown how these properties can be extended to a three dimensional rotary model. Given the inclined plane of FIG. 1 let there be a force $F_n$ applied normal to face 40 of the plane where $\theta$ equals the tilt angle 42 of the face from the vertical. The force $F_n$ can be resolved into orthogonal x and y components, as shown in the vector diagram of FIG. 2 and if x and y reaction forces are present, as also shown in FIG. 1, all forces will be in equilibrium and no motion of the plane will occur. Now note at this point that the equivalent of $F_n$ can be created by actually applying either $-F_x$ or $F_y$, provided that the one not applied is now created as a new reaction force. More specifically, let $F_y$ be applied against the plane's face by an external arm (not shown) which is free to move vertically but constrained from moving horizontally. When the arm is vertically displaced upward to create $F_y$, the arm's horizontal constraint will also create $-F_x$. Now since both $F_y$ and $-F_x$ are again present, $F_n$ is created and again creates reaction forces $+F_x$, $-F_y$, as before. To summarize this example, a set of orthogonal balancing forces can be created against the inclined plane of FIG. 1 by the generation of only one real force and three reaction forces.

Next, note that the $F_y$ and $F_x$ forces on FIG. 1 are different in magnitude as a function of the tilt angle $\theta$, as described by the equations of FIG. 2. When $\theta$ is small a given magnitude of $F_y$ will produce a much larger magnitude of $F_x$. This is the well known force multiplying property of the wedge, or more correctly the half wedge for the example shown.

Now that the properties of the single inclined plane have been observed, the examination can be extended to the double inclined plane. The right face 44 of FIG. 3 is identical to that of face 40 of FIG. 1. However, the left face 46 of FIG. 3 is now also inclined but at a different angle $\Phi$ to make the analysis more general. As in FIG. 1, if a real applied force of $F_y$ is impressed on the right face, equal $F_x$ reaction forces will have to be created on both left and right sides and an $F_y$ reaction force at the top, if the body is to remain in static equilibrium. Assume that this is done.

Then:

$$|F_x'| = |F_x|, F_x' = -F_x$$

$$F_y' = F_x' \tan \Phi = -F_x \tan \Phi = (F_y/\tan \theta) \cdot \tan \Phi$$

let $\Sigma F_y = F_y' = F_y F_y (\tan \Phi/\tan \theta) + F_y$ $$\Sigma F_y = F_y[1 + (\tan \Phi/\tan \theta)]$$

From the above, note that $\Sigma F_y$, the total $F_y$ upward, is now larger than the externally applied $F_y$. If $-F_{yt}$, which equals $\Sigma F_y$ in magnitude, is now considered an output load reaction force then there has been a force multiplication in the same direction as the input applied force $F_y$. Now suppose the body 48 of FIG. 3 is allowed to slide upward parallel to the left face 46 along the displacement vector D in FIG. 3. At the same time the point of applied $F_y$ force is moved vertically upward so as to always remain in contact with the right face 44. It can be observed that the only force vectors actually being displaced are the input vector $F_y$ and the output vector $F_{yt}$. Therefore work in equals work out and $F_y Y_1 = F_{yt} Y_2$. Observe that the displacements, $Y_1$ and $Y_2$, are in an inverse ratio to the magnitude of the input and output forces. Therefore the double faced inclined plane is acting as a force versus displacement ratio transformer in a collinear direction. Furthermore, the force-displacement transformation ratio can be changed by changing the value of either the right or left face tilt angle.

It should be noted at this point that selection of a negative $\Phi$ angle of sufficient magnitude, relative to $\theta$, will cause the double faced wedge of FIG. 2 to actually move downward as $F_y$ is moved upward. Thus the force-displacement transformation ratios include an intrinsic "backing up" or directional reversal as well. Finally for $\theta = 0°$ a special condition exist. Since input $F_n$ goes to zero, no motion of the wedge results as input $F_y$ is displaced upward. This represents a decoupling of input to output in an essentially frictionless or clutch free manner. Mathematically this case is indeterminate since it represents the product of an infinite force times zero displacement. FIG. 12 gives representative calculated values of force input/output ratios versus $\theta$ and $\Phi$ tilt angle values.

The next major step in development of the CVR transmission design is to apply the two dimensional model properties developed above to a three dimensional model. The basic building block of this 3-D model will be a circular disk mounted to a center shaft or axle by way of a universal joint type of mount. Such a disk 50 mounted to such a shaft 52 via a universal joint (U-joint not shown) is depicted in FIGS. 4a–4c. Disk 50 is therefore free to tilt or wobble on shaft 52 but any rotation of 52 must also rotate 50 and vice-versa.

Now, assume as initial conditions that disk 50 is tilted on shaft 52 at the angle $\theta$ as shown in FIG. 4a. Thus, under initial conditions, the tilt axis of disk 50 corresponds to the z-axis 54 of FIG. 4b. Next, assume that $F_n$ is impressed against disk 50 at a point near the rim as shown in FIGS. 4b, 4c. Finally, let $F_n$ move in a circular path lying in the y-z plane of FIG. 4b. Referring to FIG. 4a, this motion is analogous to the straight line motion of $F_y$ in the 2-D model of FIG. 3. Except now, the motion is a constant radius circle around the x-axis caused by the tangential force vector $F_{tan}$. As in the 2-D model, $F_n$ can be created by supplying one of its components as a real force and the normal component as a reaction force. Let the $F_{tan}$ component of $F_n$, which is initially parallel to the y-axis, be supplied as a real force and the $F_x$ component parallel to the x-axis as a reaction component. This can be accomplished by supplying $F_n$ from another independent body (not shown) rotating around the x-axis at a fixed x position. As $F_n$ is applied against disk 50, the $F_x$ component will attempt to tilt or wobble disk 50 on its U-joint and the $F_{tan}$ component will attempt to rotate both disk 50 and shaft 52 in synchronism with $F_n$'s rotation. If shaft 52 and therefore disk 50 are prevented from rotation then all displacement of disk 50 will be in the x-direction and the tilt axis of disk 50 will precess around the x-axis in synchronism with $F_n$'s rotation. There will be no change in the magnitude of the tilt angle during this precession of the tilt axis since there exists no component of force or torque around the tilt axis.

If the rotation of shaft 52 and disk 50 is allowed but any new x-direction motion of disk 50 is prevented, then disk 50 and shaft 52 will simply rotate in synchronism with $F_n$. In this case also the tilt axis of disk 50 will move around the x-axis in synchronism with $F_n$'s rotation and again there will be no change in the magnitude of the tilt angle $\theta$ of disk 50. Thus to the casual observer the motion of disk 50 might appear the same, except for the obvious difference in shaft 52 rotation. If both motions parallel to the x-axis and normal to the x-axis are allowed, then disk 50 will perform a combination precession-rotation motion.

The relative values of precession and rotation resulting from the above conditions will depend on the relative values of reaction forces in the $F_x$ and $F_{tan}$ directions. It may be observed at this point that the dis model of FIG. 4 can be considered the 3-D analog of the 2-D single inclined plane of FIG. 1. In both cases the actual instantaneous displacement of the model's face at the point of applied $F_n$ can be varied in angle and magnitude from an all x direction to an all y direction, or any value in between, depending on the reaction force load conditions established in the x and y directions. Finally, as in the 2-D model of FIG. 3, it may be observed that, depending on the tilt angle $\theta$, a force multiplication from the input $F_y$ direction to the axial x direction occurs but no force multiplication or change occurs in the y direction.

Now since a force multiplication or variation in the input direction $F_y$ (or $F_{tan}$) is the goal being sought and since this property was observed in the 2-D, two faced model of FIG. 3, the next logical step is the extension of the single disk model of FIG. 4 to a 3-D analog of the two faced wedge of FIG. 3. Such an extension is described in the next paragraph.

In FIG. 5, disk 56 is identical to disk 50 of FIG. 4a and is also mounted on shaft 60 via a universal or U-joint (not shown). In addition disk 58 is also mounted to shaft 60 via its own U-joint (not shown). Therefore both disks are capable of a wobbling or precession motion around shaft 60 as well as rotation with shaft 60. Now let disk 56 be initially set at tilt angle $\theta$ and disk 58 at tilt angle $\Phi$ as shown in FIG. 5. It is apparent that if disk 56 and disk 58 were coupled in the x direction so that an x component of force on one were coupled to the other, then FIG. 5 would be the 3-D analog of the double faced wedge of FIG. 3. However to complete the 3-D analog one additional component needs to be added. This is the component which in the 2-D model constrained the motion of the two faced wedge so that the wedge was only allowed to slide parallel to its left face along the displacement vector D. In the 3-D model this component has to create $F_n'$ of the proper magnitude and alignment relative to $F_n$ so that the composite rotation and precession motion of disk 58 is always normal to $F_n'$ at the point of contact. This means that $F_n'$ in FIG. 5 is displaced only in the y' direction just as $F_n$ is displaced only in the y direction.

The component which provides the desired reaction force is a third disk, 62, shown in FIG. 5a, which is mounted via a U-joint (not shown) to a non-rotating sleeve 64 surrounding the shaft 60 on which disk 56 and disk 58 are mounted. Disk 62 can therefore wobble or precess but it cannot rotate. In order for disk 62 to perform its function properly a coupling to disk 58 will have to be provided, similar to the coupling required between disks 56 and 58. Before proceeding with detailed explanations of the resulting disk coupling designs a more generalized development of the force vs. motion properties of the U-joint mounted disk is desirable. This is illustrated in FIGS. 6a-6c in terms of the torques produced about a set of three mutually orthogonal axes resulting from a force applied normal to the disk face 66 at any arbitrary position.

Let a force, $F_n$, be applied at a point on disk 66 in FIGS. 6a-6c which will generate torque components around all three orthogonal axes.

Let $\gamma_z$ = torque around the z axis $\gamma_x$ = torque around the x axis $\gamma_y$ = torque around the y axis $\gamma_z$ = Z axis force component·lever arm $\gamma_z = Z_f Z_L = F_n \cdot L \cos \alpha$ $\gamma_x = X_f X_L = F_y L_z = F_n \sin \theta \cdot L \sin \alpha$ $\gamma_y = y_f y_L = F_x \cdot L_z = F_n \cos \theta \cdot L \sin \alpha$ or rearranging equations:

$\gamma_z = F_n L \cos \alpha$ $\gamma_x = F_n L \cdot \sin \theta \cdot \sin \alpha$ $\gamma_y = F_n L \cdot \cos \theta \cdot \sin \alpha$ Note that the preceding general torque equations were, for simplicity, derived using a single input force vector. In practice pairs of force vectors or force couples will be used to form pure torques on the disks. From this general case, special cases applicable to the problems at hand may now be derived.

CASE I

In FIG. 6b,

Let $\alpha = 0°$ then $\gamma_z = F_n \cdot L$ $\gamma_x = 0$ $\gamma_y = 0$

This represents the case where an $F_n$ force couple is applied at 90° to the tilt axis of disk 66. At this position $F_n$ can only cause a change in the angle of tilt, $\theta$, not a change in tilt axis position.

CASE II

In FIG. 6b,

Let $\alpha = 90°$ then $\gamma_z = 0$ $\gamma_x = F_n L \sin \theta$ $\gamma_y = F_n L \cos \theta$ This represents the case previously described in FIGS. 4a-4c where now an $F_n$ force couple is applied directly to both ends of the tilt axis. There will therefore be normal components of $F_n$ present to rotate the tilt axis but none to change the tilt angle $\theta$.

CASE III

Let FIGS. 7a, 7b depict a set of force vectors or two sets of force couples placed symmetrically on either side and close to the disk 70 tilt axis.

With reference to FIGS. 7a, 7b:

For $F_{n1} \alpha_1 = 90° + \beta$ $F_{n2} \alpha_2 = 90° - \beta$ $\cos \alpha_1 = \cos (90° + \beta) = -\sin \beta$ $\cos \alpha_2 = \cos (90° - \beta) = \sin \beta$ $\sin \alpha_1 = \sin (90° + \beta) = \cos \beta$ $\sin \alpha_2 = \sin (90° - \beta) = \cos \beta$ Therefore: $\sin \alpha_1 = \sin \alpha_2 = \sin \alpha$ From the above expressions for $\cos \alpha_1$, $\cos \alpha_2$ it is apparent that, when applied to the general torque formulas of FIGS. 6a-6c, $\gamma_z = 0$, a result which could be anticipated from inspection.

Similarly, if $F_{n1} = F_{n2} = F_n$ $\gamma_x = 2F_n L \sin \theta \cdot \sin \alpha$ $\gamma_y = 2F_n L \cos \theta \cdot \sin \alpha$ Note the similarity of results between this case and that of Case II where a single force was applied directly to the tilt axis at $\alpha = 90°$. It is apparent that for the above case the magnitude of applied $F_n$'s can be adjusted for any values of assigned $\alpha$, (90° > $\alpha$ > 0°), whereby the resulting $\gamma_x$, $\gamma_y$ torques will be identical to that of Case II.

Therefore, it is concluded from the above example that a pair of $F_n$'s symmetrically located around the tilt axis of FIGS. 7a, 7b produce the equivalent torque actions of a single $F_n$ on the tilt axis. Thus Case III produces torque results identical to those of Case II. However, the Case III configuration has the important advantage that the force couples can be easily kept in constant pressure contact with the disk face for all disk tilt angles.

FIGS. 8a, 8b show how this is accomplished. Each set of four rollers 72 is mounted to a pivot, P, 74 which lies on the disk pivot axis and can thus pivot synchronously with the disk. Therefore, all coupling of force pairs, whether around the z axis or the y axis, will be of the offset balanced type requiring four contact surfaces (rollers or shoes) for torque in one direction or eight contact surfaces for bi-directional torque coupling.

If a double set of force couples, $F_n$, are applied to disk D 76 as in FIGS. 9a and 9c and if no constraints are placed on D's motion then these $F_n$ force couples will cause a rotation of D 76 around the $A_1$ axis lying in the plane of D 76. Let this rotation be opposed by the four roller coupling mechanism, rs, 78 connected to support arm, SA, 80. Since the torque axis is at an angle $\theta$ to the y axis, components of the resulting torque will exist along both the y axis and the x axis. The torque components will, of course, be equal in magnitude to the corresponding input components responsible for generating the $F_n$ components.

However, if disk D 82 in FIGS. 10a, 10b is coupled to shaft S 84 so that the $\gamma_x$ component of torque generated by $F_n$ is opposed by a reaction $\gamma_x$ through shaft S 84, then the remaining reaction of D 82 will be a rotation about the $A_2$ axis as shown in FIG. 10a. Since this axis coincides with the y axis only a $\gamma_y$ component of torque is coupled out to the support arm SA 86. Note that in this case the connection to SA 86 should be on the $A_2$ axis if only a pure $\gamma_y$ is to be experienced by SA 86.

FIGS. 11a and 11b depict a design concept for performing the function of $\gamma_y$ torque transfer from disk D 90 to an external pivot P 96 coinciding with the $A_2$ axis of FIGS. 10a, 10b. Roller sets rs 88 contact disk D 90 symmetrically around the y axis and are mounted to a circular track CT 92 which is, in turn, mounted to support arm SA 94 through a pivot P 96. The rs 88 mounting arm is attached to CT 92 so that it can slide to different angular positions along CT 92, as depicted by the arrows in FIG. 11a. The attachment from CT 92 to SA 94 lies on the y axis and thus only $\gamma_y$ is coupled to SA 94 regardless of the tilt of D 90 (assuming it's >0°). Pivot P 96 may be locked to SA 94 in which case SA 94 experiences $\gamma_y$ or $\gamma_y$ may be transfered elsewhere at P 96 by suitable linkages.

With the preceding background it is now feasible to discuss details of coupling together the three disks of FIGS. 5 56, 58 and 5a 62. The objectives being sought were as follows.

1. A method for coupling the $\gamma_y$ component of torque created on disk one 56 by the input force couple $F_n$ over to disk two 58. This in the 2-D model of FIG. 3 represents transferring $F_x$ through the wedge from one face to the opposite face.

2. A method for coupling the same $\gamma_y$ from disk two 58 to disk three 62. This in the 2-D model of FIG. 3 represents transferring $F_x$ from the second wedge face 46 to the fixed reaction face (coinciding with face 46) along which the wedge slides.

3. A method for creating the equivalent of the fixed reaction face for the 3-D rotating model. Just as the 2-D model fixed face developed both $F_y$, $F_x$ reaction forces, so therefore must disk three 62 of FIG. 5a provide $\gamma_y$, $\gamma_x$ reaction torques which react upon disk two 58 of the 3-D model.

FIGS. 14 through 17 illustrate how these objectives are accomplished. First, note that there are two types of roller set mounts. The first type labeled rs$_1$ 98 in FIGS. 15a, 15b are mounted around each disk's 100 z axis and thus pivot as the disk pivots. These rs$_1$ roller sets couple in and out $\gamma_y$, $\gamma_x$ components. The second type labeled rs$_2$ 102 in FIGS. 16a, 16b are mounted around the y axis and perform the function of transferring $\gamma_y$ components between adjacent disks. FIGS. 17a and 17b show two orthogonal views of the resulting complete assembly.

OPERATION OF INVENTION

Based upon the descriptions of the 3-D model's basic components contained in the preceding "Description of Invention" section, it is now possible to track what happens as an input torque is applied to the model. Let this input be applied to disk D$_1$ 104 of FIG. 17a or disk D$_1$ 106 of FIG. 17b. This input is applied through D$_1$'s roller set rs$_1$ 108 in FIG. 17a or 110 in FIG. 17b. The $\gamma_x$ component of this input is immediately coupled to output shaft S$_o$ 112 through D$_1$'s U-joint mount (not shown). The $\gamma_y$ component is coupled out through D$_1$'s rs$_2$ roller set 114 to pivot P 116 on support arm SA 118, where a linkage arm LA 120 transfers $\gamma_y$ to pivot P 116 of disk D$_2$'s 122 rs$_2$ roller set 114. $\gamma_y$ is then transferred into D$_2$ 122 through D$_2$'s rs$_2$ roller set 114. $\gamma_y$ is then impressed on D$_2$'s rs$_1$ roller set 108 and 110 where it is transferred via coupling arm CA 124 to disk D$_3$'s 126 rs$_1$ roller set 108. Because rs$_1$ roller sets 108, 110 always have both $\gamma_y$ and $\gamma_x$ components, a $\gamma_x$ is also created between D$_2$ 122 and D$_3$ 126. This $\gamma_x$ component, if successfully opposed by D$_3$ 126, will act on D$_2$ 122 and through D$_2$'s U-joint coupling (not shown) act on output shaft S$_o$ 112 to algebraically add to the $\gamma_x$ component generated by the initial input on D$_1$ 104. D$_3$ 126 therefore has to counter both the $\gamma_y$ and $\gamma_x$ components impressed on it by D$_2$ 122. It counters $\gamma_y$ by transferring it through D$_3$'s rs$_2$ roller set 102 to support arm SA 118. Here unlike the pivot connections 116 to D$_1$ 104 and D$_2$ 122 the connection to SA 118 is non pivoting so that $\gamma_y$ is absorbed by SA 118 and transferred back to the input shaft S$_i$ 128 where it becomes the equal and opposite reaction torque to the initial $\gamma_y$ component of the input torque $\gamma_{in}$. The $\gamma_x$ component is transferred through D$_3$'s 126 U-joint (not shown) to its fixed sleeve mount 132 and thence to the case assembly (not shown) for the transmission. Since all roller sets and disk tilt axes rotate in synchronism with the input shaft S$_i$ 128, the 90° offset position of the rs$_1$ 108, 110 and rs$_2$ 114 roller sets is always maintained. Therefore the transfer of $\gamma_x$ and $\gamma_y$ torque is a continuous dynamic process as the input shaft assembly 128 rotates.

The coasting mode where the output shaft S$_o$ 112 may drive the input shaft S$_i$ 128 is equivalent in torque transfer paths to running the input shaft S$_i$ 128 backwards. The same torque-speed relationships are maintained for both cases.

For the above sequences to occur it is essential that the rs$_1$ roller sets 108, 110 drive D$_1$ 106 and D$_2$ 122 and the rs$_2$ roller sets 114 be driven by the disks' motion rather than vice versa. This condition may be achieved by adjusting the relative clearances of the rs$_1$ 108, 110 and SA 118 mounts to the input shaft 128. The input rs$_1$ roller set connecting the input shaft 128 to disk D$_1$ 106 will have a rigid, zero backlash attachment to input shaft 128. The SA 118 support arm will have a "soft" attachment to input shaft 128. This type of attachment will provide for a small, controllable amount of angular motion between the input shaft 128 and the support arm 118. Therefore, except for the special case when disk D$_1$ 104 has a zero angle of tilt, the rs$_1$ roller set 108 connecting input shaft 128 to disk D$_1$ 104 will always be the driver of D$_1$ 104 and support arm SA 118 will be driven by the tilt axis rotation of disk D$_1$ 104. When D$_1$ is tilted to zero degrees the transmission is in the disconnect mode and the SA 118 support arm coupling to the input shaft 128 assumes the function of driving the support arm SA 118 and all of the $rs_2$ roller sets 114 attached to SA 118. However, due to the SA 118 to $S_i$ 128 coupling the support arm SA 118 will slightly lag its proper angular position relative to the tilt axes of the three disks $D_1, D_2, D_3$. Therefore, when disk $D_1$ 104 is again tilted away from the zero tilt angle position by adjustment of its $rs_1$ roller sets 108, this tilting action will force the $rs_2$ roller sets 114 mounted around disk $D_1$ 106 to be slightly displaced in angle and restored to their proper 90° of angular displacement relative to the $rs_1$ roller sets 110 of disk $D_1$ 106. It is also necessary that coupling arm CA 124 shown in FIG. 17b be attached to support arm SA 118 shown in FIG. 17a. This will serve to keep CA 124 in proper alignment with SA 118 even when disks $D_2$ 122 and $D_3$ 126 are at zero degrees tilt angle, which will be the case when a straight through 1:1 torque and speed ratio are desired. It will also provide an essential $\gamma_y$ feedback path as described below.

The key question now arises, how does feedback occur between disks $D_2$ 122, $D_3$ 126 and disk $D_1$ 104 so that $D_1$ 104 always has the proper combination of nutation-rotation motion in response to the tilt angle settings of disks $D_2$ 122 $D_3$ 126? The required feedback travels from $D_2$ 122, $D_3$ 126 through support arm SA 118 to the $rs_2$ roller sets 114 of $D_1$ 104 and thence to the tilt axis of $D_1$. This feedback has two interdependent components. To observe these components, assume that an input torque $\gamma_{in}$ is applied and that initially the output shaft $S_o$ 112 is held stationary. Next, allow So 112 to turn an infinitesimal amount and examine the effects at disks $D_2$ 122, $D_3$ 126. If $D_2$ 122, $D_3$ 126 are at zero degrees tilt angle there will be no perturbation in the $\gamma_y$ feedback to $D_1$ and therefore $D_1$'s tilt axis will move forward by the same amount as did the output shaft $S_o$ 112. However, if $D_2$ 122 and $D_3$ 126 are tilted, two things happen as $D_2$ 122 moves with the output shaft $S_o$ 112 rotation. First, due to a partial unloading of the reaction $\gamma_y$ torque at disk $D_3$ 126, there will be a corresponding decrease in reaction $\gamma_y$ coupled to $D_1$ 104. This, in effect, advances $D_1$'s 104 tilt axis away from $D_1$'s 104 $rs_1$ driving rollers 108 since it requires the $rs_1$ rollers 108 to move forward to re-establish the original load conditions. Second, as the reaction torque at $D_3$ 126 is unloaded the $rs_1$ 108 coupling arm CA 124 between $D_3$ 126 and $D_2$ 122 will be displaced incrementally in angle as it reacts from the tilted face of $D_3$. This motion will be transferred to SA 118 and to $D_1$ through $D_1$'s 104 $rs_2$ rollers 114 and will serve to move $D_1$'s 104 tilt axis. This tilt axis motion can either be forward or backward relative to input shaft $S_{in}$ 128 motion, depending on whether $D_2$ 122 and $D_3$ 126 have a positive or negative tilt angle relative to $D_1$ 104. The combination of these two effects can then account for the input-output relationships for all combinations of disk tilt angle settings.

When $D_2$ 122 and $D_3$ 126 are tilted in a positive direction so that their $\gamma_x$ torque component adds to that of $D_1$ 104, then both $D_3$ 126 reaction effects act to move $D_1$'s 104 tilt axis forward away from the driving $rs_1$ rollers 108. Thus the $rs_1$ rollers 108 have to move farther but at a decreased load.

When $D_2$ 122 and $D_3$ 126 are tilted in a negative direction but at a smaller magnitude relative to $D_1$ 104 ($|\theta| > |-\Phi|$) then the two $D_3$ 126 reaction effects act to move $D_1$'s 104 tilt axis backwards against $D_1$'s 104 $rs_1$ driving rollers 108. The load on these $rs_1$ rollers 108 is therefore increased and they must move $D_1$'s 104 tilt axis forward an added increment by rotation to re-establish initial load conditions. Operation under these conditions gives a torque reduction, speed increase output.

When $D_2$ 122 and $D_3$ 126 are tilted negatively equal in magnitude to $D_1$'s 104 positive tilt ($|\theta| = |-\Phi|$) the entire mechanism is locked up and no rotation is possible without damage to the components. This is obviously a tilt combination to be avoided unless a locking feature is desired and the maximum anticipated applied stress is well below the design safety limits of the transmission.

When $D_2$ 122 and $D_3$ 126 are tilted in a negative direction and at a larger magnitude relative to $D_1$ 104 ($|-\Phi| > |\theta|$) then the two $D_3$ 126 reaction effects act in opposite directions. Since the $\gamma_x$ component on $D_2$ 122 now becomes larger than the $\gamma_x$ component on $D_1$ 104, it acts to drive the output shaft $S_o$ 112 in the reverse direction. As this happens the angular displacement reaction effect of $D_3$ 126 on SA 118 acts to move $D_1$'s 104 tilt axis backward against $D_1$'s 104 $rs_1$ driving rollers 108. However, the decreased $\gamma_y$ reaction effect acts to move the $D_1$ 104 tilt axis away from the $rs_1$ rollers 108 and since this is now the larger of the two reaction effects, continued forward progress of the $D_1$ 104 $rs_1$ driving rollers 108 is allowed. The result is reverse rotation of the output shaft $S_o$ 112.

Disk tilt angle control may be used to effectively create a lossless disconnect or friction independent clutch function from the input power source. Under disconnect conditions, the input disk $D_1$ 104 goes to 0° tilt angle, which can be interpreted as infinite torque times zero displacement at the output. For power engagement, the input disk $D_1$ 104 is smoothly tilted to a small fixed angle and the tilt angles of $D_2$ 122 and $D_3$ 126 are then varied in synchronism for the desired changes in torque-speed ratios.

Certain required details of the invention have not been elaborated upon since they are considered to be conventional engineering design tasks. These include details of the universal joints used to mount disks $D_1$ 104, $D_2$ 122 and $D_3$ 126 to their respective shafts and details of the linkage mechanisms required to set and maintain the desired tilt angles on disks $D_1$ 104, $D_2$ 122 and $D_3$ 126. For the universal joints, a coaxial version of either the Cardan or Hook joint or the Bendix-Weiss joint can be employed. For the disk tilt mechanisms, the use of sliding collars mounted on the input shaft 128 and connected by push-pull linkage arms to the $rs_1$ roller sets 110 of disks $D_1$ 106, $D_2$ 122 and $D_3$ 126 is the most direct and preferred way to accomplish the task. In operation, the collars will be slid to desired positions along the input shaft $S_1$ 128 by an externally mounted roller or shoe meshing with the collars and driving them from an external control source. The sliding collars will, in turn, change the tilt angles of the three disks 106, 122, 126 through the pivot mountings of $rs_1$ roller sets 110. Only two sliding collars will be required since disks $D_2$ 122 and $D_3$ 126 are always tilted in synchronism to the same angle and can therefore share the same linkage.

The external disk tilt angle control mechanism can run the gamut from simple to complex. For simple applications such as a lawn tractor an operator controlled single lever can be used to activate suitable cams which can, in turn, control the above described linkage system. For motor vehicle use a microprocessor controlled, electro-hydraulic activated system will yield the ultimate in control efficiency. The control system can be easily matched to any engine-load combination by the insertion of an appropriate PROM into the microprocessor controller. Operator selection of multiple performance curves (e.g. maximum fuel economy, maximum power, engine braking profile) will be easily obtainable.

CONCLUSIONS, RAMIFICATIONS, AND SCOPE OF INVENTION

Thus the reader will see that the transmission of the invention constitutes a basically new concept in torque-speed ratio control and provides a new level of efficiency never before available. This results from the use of all positive displacement, friction independent coupling surfaces. These surfaces are three dimensional rotating equivalents of the double faced, asymmetrical inclined plane of basic physics. The resulting invention provides a transmission in which the input-output speed-torque ratios can be continuously varied in both forward and reverse directions over a large dynamic range and bi-directional power flow is intrinsic. A lossless disconnect or "frictionless clutch" function is also intrinsic to the invention. All other presently employed transmissions, which offer continuously variable speed-torque ratios, have serious limitations in one or more of the above areas. Most frequently, they have friction surface couplings which makes them low in power transfer efficiency and high in coupling surface wear rate, resulting in limited useful lifetimes.

The invention is of great practical utility since there are no basic limits on the areas used for force and motion transfer surfaces. Tapered roller to disk face coupling can be non-slip over all size ratios. Therefore stress loads can be superior to gear type couplings and the invention can be scaled to all size, power and speed regimes. In addition to motor vehicle and industrial machine applications, the invention has application to all other devices or mechanisms requiring variable speed-torque ratio control. To illustrate the extreme range of possible applications, consider the bicycle drive on the lower power end and the locomotive or the marine propulsion systems on the upper power ends. Obviously, many other examples can be envisioned by the reader. Thus the scope of the invention should be determined by the appended claims and their legal equivalents, rather than by the examples given.

I claim:

1. A continuously variable torque versus speed ratio transmission comprising:
   (a) An input shaft (128) means mounted for rotatably supporting a first (134) and second (118) set of support arms.
   (b) said first set of support arms (134) means mounted at one end of said input shaft (128) so as to first extend outward at right angles in opposite directions from one end of said input shaft (128) and then curve away from said input shaft (128) in a direction parallel to said shaft (128); and
   (c) said first set of support arms (134) means mounted so as to rotate in rigid synchronism with said input shaft (128);
   (d) said second set of support arms (118) means mounted to said input shaft (128) so as to share the same end of said input shaft (128) as said first set of support arms (134) but having a 90 degree angular displacement thereto;
   (e) said second set of support arms (118) means mounted so as to first extend outward at right angles in opposite directions from said input shaft (128) and then curve away from said input shaft (128) in a direction parallel to said input shaft; and
   (f) said second set of support arms (118) means mounted so as to rotate in non-rigid synchronism with said input shaft (128);
   (g) an output shaft (112) means mounted for rotatably supporting a first (104) (106) and second (122) circular disk while being aligned end to end with said input shaft (128); (h) said first (104) (106) and second (122) circular disks, means mounted about said output shaft (112) such that said disks must rotate in synchronism with said output shaft (112) while being free to wobble on said shaft;
   (i) a non-rotating sleeve (130) means mounted about said output shaft (112) opposite the shaft end contiguous to said input shaft (128);
   (j) a third circular disk (126) means mounted about said non-rotating sleeve (130) so that said third circular disk (126) may be free to wobble but constrained from rotation on said non-rotating sleeve (130);
   (k) a third set of support arms (124) means mounted about said output shaft (112) so as to occupy the space between said second (122) and said third (126) circular disks and so as to rotate freely on said output shaft (112);
   (l) a first type of roller set (110) means mounted to said third set of support arms (124) so as to be in firm contact at eight symmetrically opposing points on both said second (122) and third (126) circular disks; and
   (m) said first type of roller sets (110) means mounted to said third type support arms (124) means pivoting action of said roller sets on said support arms with resulting pivoting of said second (122) and third (126) circular disks;
   (n) said third set of support arms (124) means mounted to both said output shaft (112) and said first type of roller sets (110) such that a component of torque coaxial with said output shaft (112) and a component of torque normal to said coaxial component of torque may be coupled between said second circular disk (122) and said third circular disk (126);
   (o) said first type of roller set (108) (110) means mounted to said first set of support arms (134) so as to be in firm contact at eight symmetrically opposing points on said first disk (104) (106); and
   (p) said first type of roller sets (108) (110) means mounted to said first set of support arms (134) means pivoting action of said roller sets on said support arms with resulting pivoting of said first circular disk (104) (106);
   (q) said first type of roller sets (108) (110) means mounted to both said first type of support arms (134) and said first circular disk (104) (106) such that a component of torque coaxial with said output shaft (112) and a component of torque normal to said coaxial component of torque may be coupled between said input shaft (128) and said first circular disk (104) (106);
   (r) a second type of roller set (114) means mounted to be in firm contact at eight symmetrically opposing points on said first (104) (106), second (122) and third (126) circular disks;
   (s) said second type roller sets (114) means mounted to said parallel extensions of said second set of support arms (118) to rotate in synchronism with said input shaft (128) and maintain said 90 degree angular separation from said first type roller sets (108) (110);

(t) said second type of roller sets (114) means mounted to said second set of support arms (118) to allow tilting of said first (104), second (122) and third (126) circular disks about their respective said first type roller sets (108) (110) pivot mounts while said second type roller sets (114) maintain firm contact with said circular disks at all tilt angles of said circular disks;

(u) said second type of roller sets (114) means mounted to said second set of support arms (118) to allow said component of torque normal to said coaxial component of torque to be coupled between said circular disks one (104) and two (122);

(v) said second type of roller sets (114) means mounted to said second set of support arms (118) to allow said component of torque normal to said coaxial component of torque to be coupled rigidly between said circular disk number three (126) and said second set of support arms (118);

(w) control means for setting of said tilt angles of said circular disks two (122) and three (126) about their respective said first type of roller sets (108); and (x) independent control means for setting of said tilt angles of said circular disk one (104) about its said first type of roller set (108);

(y) in combination, means for said rotation of said input shaft (128) and said setting of said tilt angles of said circular disks one (104), two (122) and three (126) to obtain, by positive displacement motion of said circular disks, a continuously variable speed versus torque ratio between said input shaft (128) and said output shaft (112), to include forward, reverse and zero rotation of said output shaft (112) for a given fixed rotation of said input shaft (128).

2. The invention of claim 1, wherein said second set of support arms (118) is means mounted to said input shaft (128) to result in a controlled amount of bidirectional play between said second set of support arms (118) and said input shaft (128).

3. The invention of claim 1, wherein said first (104) and second (122) circular disks are means mounted to said output shaft (112) through a coaxial universal joint.

4. The invention of claim 1, wherein said third circular disk (126) is means mounted to said non-rotating sleeve (130) through a coaxial universal joint.

5. The invention of claim 1 wherein said third set of support arms (124) are comprised of two semi-circular members means mounted back to back on said output shaft (112) and means connected by a central gear so as to transfer torque uni-directionally between said semi-circular members.

6. The invention of claim 1 wherein said first type of roller set (108) (110) is comprised of four rollers (72) means mounted to be pivotally supported from a single central shaft (74) and means spaced to form a face to face circular arc with rollers at the arc's opposite interior corners.

7. The invention of claim 6 wherein the said first type of roller set (108) (110) is further means mounted from said central shaft (74) to a circular track (92) and thence to said second set of support arms (94) to form said second type of roller set mount (114).

8. The invention of claims 6 or 7 wherein said four rollers of said first type roller sets (108) (110) are replaced with four low friction sliding shoes.

9. The invention of claim 1 wherein a linkage arm (120) means mounted to said second set of support arms (118) means couples said normal component of torque between said second type roller sets (114) mounted to said first (104) and second (122) circular disks.

10. The invention of claim 1 wherein means linkage is provided for external control through a sliding collar on said input shaft means coupled to said first type roller sets (108) (110) on said circular disks two (122) and three (126) to select desired said tilt angles of said circular disks about their said first type roller sets pivot mounts.

11. The invention of claim 10 wherein additional said linkage is added to allow independent external tilt control of said circular disk one (104) around its said first type roller sets pivot mount (74).

12. The invention of claims 10 or 11 where, in combination, external control signals are generated to set the said tilt angles of said circular disks one (104), two (122) and three (126) and thus control the said torque versus speed ratio through the said transmission.

13. The invention of claim 12 wherein said external control signals are generated to set said tilt angles of said circular disks one (104), two (122), and three (126) to result in reverse direction rotation of said output shaft (112) with respect to said input shaft (128).

14. The invention of claim 12 wherein said external control signals are generated to set said tilt angles of said circular disks one (104), two (122) and three (126) to result in independence of said rotation between said input (128) and output (112) shafts.

* * * * *

UNITED STATES PATENT AND TRADEMARK OFFICE
CERTIFICATE OF CORRECTION

PATENT NO. : 5,140,864
DATED : Aug. 25, 1992
INVENTOR(S) : Durwood L. Creed

It is certified that error appears in the above-indentified patent and that said Letters Patent is hereby corrected as shown below:

Column 3, line 16, change "$U_3$" to --$U_j$--.

Column 5, line 5, change "$\{Fy=Fy'=FyFy(tan\phi/tan\theta)+Fy$" to --$\Sigma F_y = F_y' + F_y = F_y (tan\lambda/tan\theta) + F_y$--

Signed and Sealed this

Thirty-first Day of August, 1993

Attest:

BRUCE LEHMAN

Attesting Officer

Commissioner of Patents and Trademarks